United States Patent [19]
Norton

[11] Patent Number: 6,023,063
[45] Date of Patent: *Feb. 8, 2000

[54] INFRARED DETECTOR WITH REDUCED OPTICAL SIGNATURE

[75] Inventor: Paul R. Norton, Santa Barbara, Calif.

[73] Assignee: Raytheon Company, Lexington, Mass.

[*] Notice: This patent is subject to a terminal disclaimer.

[21] Appl. No.: 07/811,599

[22] Filed: Dec. 18, 1991

[51] Int. Cl.[7] ............................... H01J 7/24; H01L 25/00
[52] U.S. Cl. ......................................... 250/338.4; 250/332
[58] Field of Search .................. 250/338.4, 332

[56] References Cited

U.S. PATENT DOCUMENTS 5,030,828  7/1991  Solomon .............................. 250/338.4
5,130,259  7/1992  Bahraman .............................. 250/332
5,144,138  9/1992  Kinch et al. ............................ 250/332

*Primary Examiner*—Mark Hellner
*Attorney, Agent, or Firm*—W. C. Schubert; G. H. Lenzen, Jr.

[57] ABSTRACT

Absorption coatings utilized in a detector array reduces the optical signature of an infrared detector or detector array by reducing the undesirable reflections from exposed metal surfaces and non-planar surface features within the photodetector array. The application of an absorption coating, consisting of a single layer black coating, a multi-layer dark coating, a moth-eye surface structure, or a combination of these, reduces the undesired reflected radiation for a relevant spectral range. Accordingly, the optical signature of the detector array is reduced and the problems of optical crosstalk and ghost images are eliminated.

16 Claims, 1 Drawing Sheet

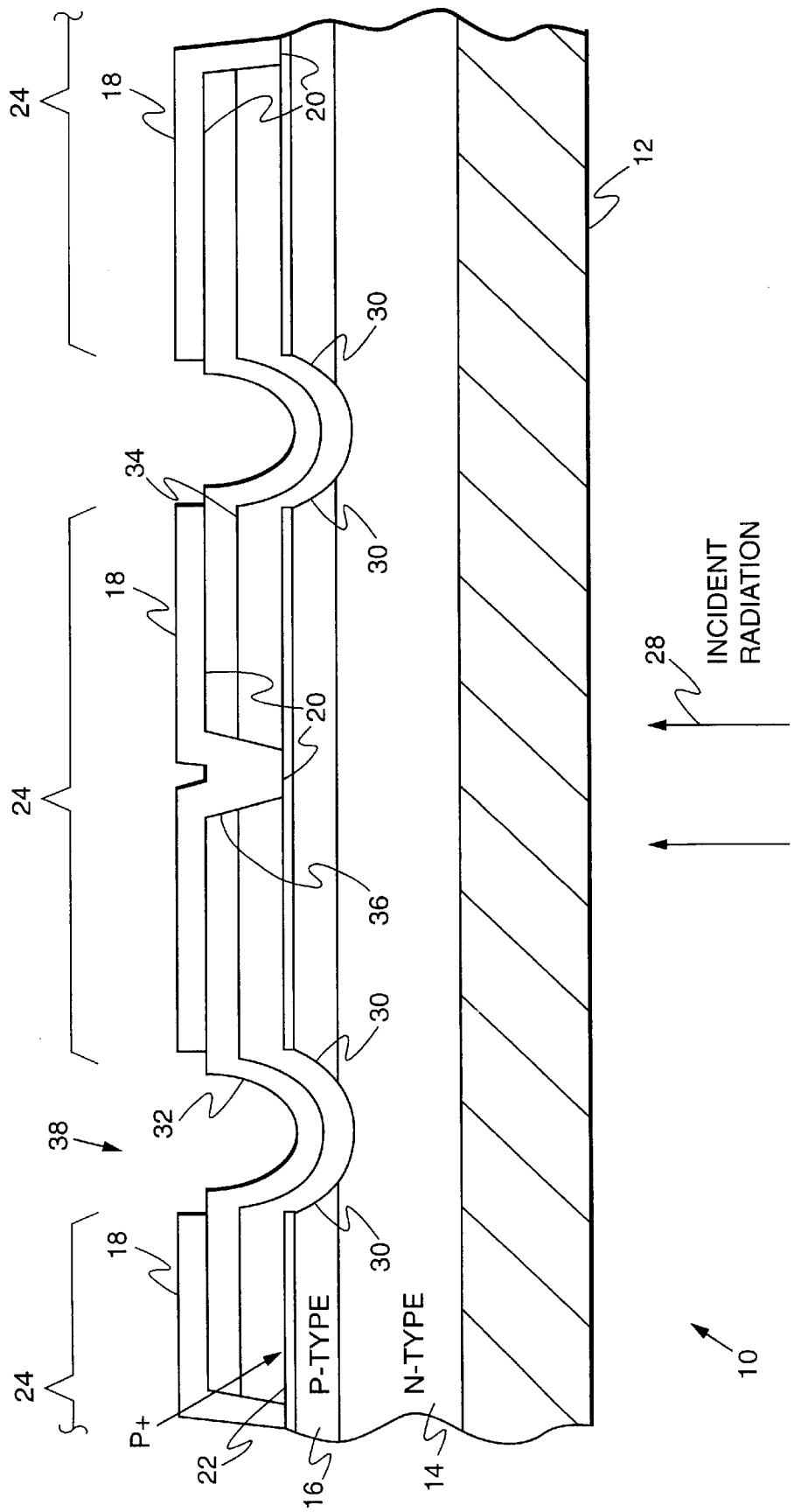

INFRARED DETECTOR WITH REDUCED OPTICAL SIGNATURE

BACKGROUND OF THE INVENTION

1. Field of the Invention

The invention relates to photodetectors for producing detectable signals from incident radiation, such as infrared radiation.

2. Description of the Related Art

Photodetectors made of mercury cadmium telluride (HgCdTe) semiconductor material are disclosed in U.S. Pat. No. 3,949,223, issued Apr. 6, 1976, and entitled, "Monolithic Photoconductive Detector Array."

As the '223 patent discloses, when radiation of the proper energy falls upon a semiconductor, its conductivity increases. Energy supplied to the semiconductor causes the covalent bonds to break, and electron/hole pairs (also called majority/minority carriers) in excess of those generated thermally are created. These increased current carriers increase the conductivity of the material. This so-called "photoconductive effect" in semiconductor materials is utilized in photodetectors.

Photodetectors, and particularly arrays of such photodetectors, have many applications. One application is the detection of infrared radiation. Infrared sensitive photodetector arrays are used for various heat and object sensing applications.

Typically, a photodetector array comprises a substrate that is electrically insulating, such as a dielectric or wide band-gap semiconductor, attached to a body of semiconductor material forming a region of first conductivity type (e.g., n-type) and a region of a second, opposite conductivity type (e.g., p-type) where the second region overlies the first region. Individual detectors of the array are delineated and isolated by masking, and then cutting or etching.

Present detector arrays have unacceptably high reflected light signatures which may compromise their effectiveness. Due to the imperfect absorption of the HgCdTe sensitive layer, for example, a significant amount of light is reflected from the areas of exposed metal (e.g., electrical contact pads), as well as non-planar surface features (e.g., mesa edges). It would be advantageous to minimize the undesirable reflections, thus reducing the optical signature of the detector, reducing optical cross-talk effects and reducing the risk of detectors generating ghost images.

While single detectors and detector arrays each possess optical signatures that may be reduced by minimizing undesirable reflections, optical cross-talk and ghost images are problems particular to detector arrays. Optical cross-talk and ghost images can be defined as the presence of any unwanted radiation impinging on any detector in an array other than the one onto which it is meant to be focused.

SUMMARY OF THE INVENTION

In accordance with this invention, the optical signature of an infrared detector or detector array can be reduced by utilizing means for reducing the undesirable reflections within said photodetector array from reflective surfaces, such as exposed metal surfaces, and means for reducing the undesirable reflections within said photodetector array from non-planar surface features within the photodetector array.

The application of an absorption coating, consisting of a single layer black coating, a multi-layer dark coating, a moth-eye surface structure, or a combination of these, reduces the undesired reflected radiation for a relevant spectral range. Thus, the optical signature for the detector array is reduced. The use of the absorption coating also overcomes the problems of optical cross-talk and ghost images that occur in detector arrays.

To reduce the undesired reflected radiation from reflective surfaces such as exposed metal surfaces, a substantial portion of the metal surfaces (e.g., electrical contacts) are concealed behind the absorption coating. Thus, the incident radiation is prevented from reaching the metal surfaces, preventing undesired reflected radiation. A $p^+$-type region may be utilized for improving ohmic contacts, and for minimizing diffusion of minority carriers, to the electrical contacts.

For the non-planar surface features within the photodetector array (e.g., mesa edges), the deposition of an anti-reflective coating and absorption coating adjacent to the non-planar surface features reduces undesired reflected radiation. The anti-reflective coating reduces the reflectance and increases the transmittance of the incident radiation at the boundary of the mesa edge, for example. The incident radiation is then absorbed in the absorption coating which is encountered beyond the anti-reflective coating.

BRIEF DESCRIPTION OF THE DRAWINGS

FIG. 1 is a cross-section view of a segment of a typical photodetector array with reduced optical signature.

DESCRIPTION OF THE PREFERRED EMBODIMENTS

FIG. 1 illustrates a section of the photodetector array 10 with reduced optical signature. In preferred embodiments, a photodetector array 10 comprises a substrate 12 that is electrically insulating, such as a dielectric or wide band-gap semiconductor. A body of semiconductor material forming a region of first conductivity type 14 (e.g., n-type) is deposited on the substrate 12, with a region of a second, opposite conductivity type 16 (e.g., p-type) overlying the first region 14. Optionally, a region of a third conductivity type 22 (e.g., $p^+$-type) may be added atop the second region 16 to function as a means for improving ohmic contacts and for minimizing diffusion of minority carriers to electrical contacts 18 affixed to the top of the detectors 24.

The reflective surfaces 20 in the photodetector array include the metal surfaces of the electrical contacts 18 which engage the region of third conductivity type 22 (or the region of second conductivity type 16 where the optional third region 22 is not used). In a preferred embodiment, incident radiation enters the photodetector array 10 through the substrate 12 and traverses the various regions of conductivity types. (The operation of photodetectors, including both photoconductive and photovoltaic detectors, is well-known in the art and therefore not discussed here.) The incident radiation 28 which reaches the reflective surfaces 20 may produce undesired reflected radiation.

In addition to the reflective surfaces 20, mesa edges 30 may also reflect the incident radiation 28 and are therefore an additional source of undesired reflected radiation. Mesa edges 30 result from the etching process which forms the individual detectors 24 within the photodetector array 10. In a detector array 10, the undesired reflected radiation produces cross-talk in adjacent or nearby photodetectors in the array, and ghost images in detectors within the array which are not in the immediate vicinity.

To reduce the undesired reflected radiation, an absorption coating 32 is deposited between the electrical contacts 18 and the region of third conductivity type 22 (or the region of second conductivity type 16 where the optional third region 22 is not used). Most of the reflective surfaces 20, the metal surfaces of the electrical contacts 18, are concealed behind the absorption coating 32 where the incident radiation will be absorbed before it can reach the reflective surfaces, where it would produce undesired reflected radiation. This reduces the exposed metal surfaces of the electrical contacts 18 to a very small opening 36 in the absorption coating 32, enabling the electrical contacts 18 to couple with the region of second conductivity type 16, in the embodiment shown, the collector. The region of third conductivity type 22 improves the contact resistance characteristics of the collector.

In a preferred embodiment, a passivation layer with an anti-reflective coating 34 is deposited between the region of third conductivity type 22 (or the region of second conductivity type 16 where the optional third region 22 is not used), and the absorption coating 32. The passivation layer 34 is a dielectric which acts to stabilize the electronic charge on the surface of the region of third conductivity type 22 (or the region of second conductivity type 16 where the optional third region 22 is not used). The anti-reflective coating in the passivation layer 34 reduces the reflectance at the boundary as the incident radiation 28 transitions from the region of third conductivity type 22 (or the region of second conductivity type 16 where the optional third region 22 is not used) to the absorption coating 32.

The anti-reflective coating in the passivation layer 34 and the absorption coating 32 also serve to reduce the undesired reflected radiation from non-planar surface features (e.g., mesa edges) 30. In the absence of the anti-reflective coating in the passivation layer 34, the boundary between the regions of conductivity 16, 22 and air at the mesa edges would produce undesired reflected radiation. With the anti-reflective coating in the passivation layer 34 deposited adjacent to the mesa edges, the undesired reflected radiation is reduced as the incident radiation 28 is more fully transmitted to the passivation layer 34 and then absorbed in the adjacent absorption coating 32. Undesired reflected radiation is also reduced due to diffraction of the incident radiation 28 at the mesa edge boundaries of the regions of conductivity 16, 22 and the anti-reflective coating in the passivation layer 34. The absorption coating 32 also serves to reduce the amount of stray radiation 38 entering the array 10 from the rear. One source of stray radiation 38 includes incident radiation 28 that has passed through the passivation layer 34 and the absorption coating 32 which is reflected back to the rear of the array 10.

In preferred embodiments, the absorption coating 32 comprises, either singly or in combination, a single layer black coating, a multi-layer dark coating, and a moth-eye surface structure with very low reflectivity. An example of a single layer black coating used for the absorption coating 32 is black paint. Examples of multi-layer dark coatings which may be used in the absorption coating 32 are discussed in U.S. Pat. No. 4,282,290, issued Aug. 4, 1981, entitled "High Absorption Coating" and Macleod, H. A., *Thin-Film Optical Filters,* (2nd Ed.), MacMillan Publishing Co., New York, N.Y. (1986). The moth-eye surface structure contains surface features on a scale smaller than a wavelength such that the surface reflects very little undesired radiation. A common example of such a surface structure is non-glare glass used in picture frames.

In a given embodiment, the relevant spectral region will determine whether single layer black coating, a multi-layer dark coating, or a moth-eye surface structure, or a combination of these, are utilized for the absorption coating 32. Multi-layer dark coatings are designed for a relevant spectral range by varying the materials used for the various layers, the thickness of the layers and the number of layers. Moth-eye surface structures can be tailored for particular spectral bands by varying the height, shape, spacing and pattern arrangement.

The above-described embodiments can be applied to both photovoltaic and photoconductive detectors, and are furnished as illustrative of the principles of the invention. They are not intended to define the only embodiment possible in accordance with our teaching. Rather, the invention is to be considered as encompassing not only the specific embodiments shown, but also any others falling within the scope of the following claims.

What is claimed is:

1. A photodetector having a reduced optical signature for a desired spectral range of radiation comprising:

an insulating substrate;

an electrically conductive portion located adjacent to said substrate;

an electrical contact having a reflective surface, said electrical contact being electrically coupled to said electrically conductive portion; and a first means for absorbing a desired spectral range of radiation between said electrically conductive portion and said contact, said means for absorbing defining a via therethrough so that only a small portion of said electrical contact contacts said electrically conductive portion through said via.

2. The photodetector of claim 1 wherein said first means for absorbing comprises a single layer absorption coating.

3. The photodetector of claim 1 wherein said first means for absorbing comprises a multi-layer absorption coating.

4. The photodetector of claim 1 wherein said first means for absorbing comprises a moth-eye surface structure.

5. The photodetector of claim 1, said photodetector having non-planar surface features, further comprising a second means for absorbing a desired spectral range of radiation adjacent to said non-planar surface features.

6. The photodetector of claim 5 wherein said second means for absorbing comprises a single layer absorption coating.

7. The photodetector of claim 5 wherein said second means for absorbing comprises a multi-layer absorption coating.

8. The photodetector of claim 1 wherein said electrically conductive portion includes a p-n junction.

9. A photodetector having a reduced optical signature for a desired spectral range of radiation comprising:

an insulating substrate;

a first electrically conductive portion located adjacent to said substrate;

a second electrically conductive portion located adjacent to said first portion;

an electrical contact having a reflective surface, said electrical contact being electrically coupled to said second electrically conductive portion; and means for absorbing a desired spectral range of radiation between said second electrically conductive portion and said contact, said means for absorbing defining a via therethrough so that only a small portion of said electrical contact contacts said second electrically conductive portion through said via.

10. The photodetector of claim 9 wherein said first and second electrically conductive portions form a p-n junction.

11. The photodetector of claim 9 wherein said means for absorbing comprises a single layer absorption coating.

12. The photodetector of claim 9 wherein said means for absorbing comprises a multi-layer absorption coating.

13. The photodetector of claim 9 wherein said means for absorbing comprises a moth-eye surface structure.

14. The photodetector of claim 9 further comprising a third electrically conductive portion located between said second portion and said electrical contact.

15. A method for reducing the optical signature of a photodetector, said photodetector having an insulating substrate, an electrically conductive portion located adjacent to said substrate, an electrical contact having a reflective surface, said electrical contact being electrically coupled to said electrically conductive portion, and non-planar surface features, comprising the steps of:

depositing an absorption coating for a desired spectral range of radiation between said electrically conductive portion and said contact; and forming a via therethrough so that only a small portion of said electrical contact contacts said electrically conductive portion through said via.

16. The method of claim 15, further comprising the step of depositing an absorption coating for a desired spectral range of radiation adjacent to said non-planar surface features.

* * * * *